United States Patent [19]

Rohlinger

[11] Patent Number: 5,373,755
[45] Date of Patent: Dec. 20, 1994

[54] SKIRT DEFLECTOR FOR A BALL NUT AND SCREW DEVICE

[75] Inventor: Mark D. Rohlinger, Woodstock, Ill.

[73] Assignee: Dana Corporation, Toledo, Ohio

[21] Appl. No.: 99,945

[22] Filed: Jul. 30, 1993

[51] Int. Cl.$^5$ .............................................. F16H 25/22
[52] U.S. Cl. ................................. 74/459; 74/424.8 R
[58] Field of Search ................ 74/89.15, 424.8 R, 459

[56] References Cited

U.S. PATENT DOCUMENTS

| | | |
|---|---|---|
| 2,505,131 | 4/1950 | Means, Jr. |
| 2,636,397 | 4/1953 | Jacubenta . |
| 2,833,156 | 5/1958 | Spontelli .................. 74/459 |
| 2,851,847 | 9/1958 | Cochraine ................. 74/459 |
| 2,885,792 | 10/1958 | Gates ....................... 74/459 |
| 2,890,594 | 6/1959 | Galonska . |
| 2,995,947 | 8/1961 | Grabowski . |
| 3,053,105 | 9/1962 | Cole . |
| 3,529,486 | 9/1970 | Galonska et al. . |
| 3,971,264 | 7/1976 | Detraz et al. . |
| 4,177,690 | 12/1979 | Klinkenberg . |
| 4,604,911 | 8/1986 | Teramachi . |
| 4,750,378 | 6/1988 | Sheppard . |
| 4,864,884 | 9/1989 | Klinkenberg . |
| 5,005,436 | 4/1991 | Brusasco . |
| 5,014,568 | 5/1991 | Schlenker . |
| 5,142,929 | 9/1992 | Simpson, III . |

FOREIGN PATENT DOCUMENTS 558710 5/1923 France ..................... 74/459

*Primary Examiner*—Allan D. Herrmann
*Attorney, Agent, or Firm*—MacMillan, Sobanski & Todd

[57] ABSTRACT

A mechanism for diverting balls contained in a ball nut and screw device into and out of a ball recirculation tube includes a pair of apertures formed through the nut which extend from the outer surface thereof inwardly to the axial end of complementary helical threads formed on the screw and the nut. Within each of the apertures, a step is formed which extends partially about the inner surface thereof. A skirt deflector is provided in each of the apertures for guiding the balls into and out of the complementary threads. Each of the skirt deflectors includes an upper flange portion and a depending skirt portion. Pick-up fingers extend downwardly from the lower ends of the skirt portions further into each of the apertures. A step is defined between the skirt portion and the pick-up finger on each of the skirt deflectors. The steps formed on the skirt deflectors are positioned opposite the steps formed within the apertures when the skirt deflectors are installed therein. A tube is provided for transferring the balls between the apertures. When the tube is installed, the lowermost ends thereof abut and are supported on the steps formed in the apertures and on the steps formed on the skirt deflector.

30 Claims, 3 Drawing Sheets

SKIRT DEFLECTOR FOR A BALL NUT AND SCREW DEVICE

BACKGROUND OF THE INVENTION

This invention relates in general to ball nut and screw devices and in particular to an improved structure for diverting the balls contained in such a ball nut and screw device into and out of a ball recirculation tube.

The ball nut and screw device is a well known apparatus which is designed to translate rotary motion of one member into linear motion of another member. A typical ball nut and screw device includes an elongated cylindrical screw which extends through a cylindrical opening formed through a nut. The outer surface of the screw and the inner surface of the nut are formed having complementary helical threads which are generally semi-circular in cross section. However, the outer diameter of the screw is smaller than the inner diameter of the opening formed through the nut. Thus, the outer surface of the screw and the inner surface of the opening formed through the nut do not engage one another. Rather, a plurality of balls are disposed between the screw and the nut. Each of the balls extends partially into both of the complementary threads formed in the screw and the nut so as to provide a rolling engagement therebetween, similar to a ball bearing apparatus.

Typically, the screw is connected to a source of rotational power, while the nut is connected to a load to be moved. By virtue of its connection with the load, the nut is usually restrained from rotating. Thus, when the screw is rotated by the source of rotational power, the nut (and the load connected thereto) are moved axially relative to the screw. Because of the rolling engagement of the balls with the complementary threads of the screw and the nut, such linear movement of the nut is accomplished with very little friction. It will be appreciated that in some applications, it may be desirable to connect the screw to the load to be moved and the nut to the source of rotational power.

However, as the balls roll through the complementary threads of the screw and the nut, they also roll axially therethrough. To accommodate this axial rolling movement of the balls, it is known to provide a mechanism for recirculating the balls from one end of the complementary threads to the other in an endless loop. This ball circulation mechanism typically includes a pair of apertures formed through the nut which extend outwardly from the opposite ends of the complementary threads to the outer surface of the nut. A tube extends across the outer surface of the nut between these two apertures. The tube conducts the balls out the aperture at one end of the nut, across the outer surface thereof, and into the aperture at the other end of the nut to accommodate the rolling axial movement thereof.

It is known to provide some means for facilitating the smooth passage of the recirculating balls into and out of the tube. In one type of ball nut and screw device, the ends of the tube are provided with integral finger portions which extend through the apertures into the area of the complementary threads. The finger portions engage and deflect the balls into and out of the ends of the tube and the complementary threads. While effective, the finger portions of the tube are relatively thin and, thus, subject to breakage. In another type of ball nut and screw device, a deflector body is installed within the complementary threads of the screw and the nut adjacent each of the nut apertures. Each of the deflectors has a surface formed thereon which engages and deflects the balls into and out of the ends of the tube and the complementary threads. Usually, the deflectors are installed from the interior of the nut, with a stud portion extending through a mounting aperture to a threaded fastener provided on the exterior of the nut. This design has improved strength over the tube finger portion design described above, but is more expensive and difficult to install. Thus, it would be desirable to provide an improved mechanism for diverting the balls contained in a ball nut and screw device into and out of a ball recirculation tube which is simple and inexpensive in structure and operation.

SUMMARY OF THE INVENTION

This invention relates to an improved mechanism for diverting the balls contained in a ball nut and screw device into and out of a ball recirculation tube. The ball recirculation mechanism includes a pair of apertures formed through the nut which extend from the outer surface thereof inwardly to the axial end of complementary helical threads formed on the screw and the nut. Within each of the apertures, a step is formed which extends partially about the inner surface thereof. A skirt deflector is provided in each of the apertures for guiding the balls into and out of the complementary threads. Each of the skirt deflectors includes an upper flange portion and a depending skirt portion. The upper flange portions are generally oval-shaped and are sized to fit within respective oval-shaped recesses formed in the upper surface of the nut adjacent the apertures. The depending skirt portions are generally semi-circular in shape and are sized to fit within the apertures opposite to the steps provided therein. Pick-up fingers extend downwardly from the lower ends of the skirt portions further into each of the apertures. A step is defined between the skirt portion and the pick-up finger on each of the skirt deflectors. The steps formed on the skirt deflectors are positioned opposite the steps formed within the apertures when the skirt deflectors are installed therein. A tube is provided for transferring the balls between the apertures. The tube is formed having a pair of opposed end portions which curve downwardly and extend into the apertures. When the tube is installed, the lowermost ends of the end portions abut and are supported on the steps formed in the apertures and on the steps formed on the skirt deflector.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
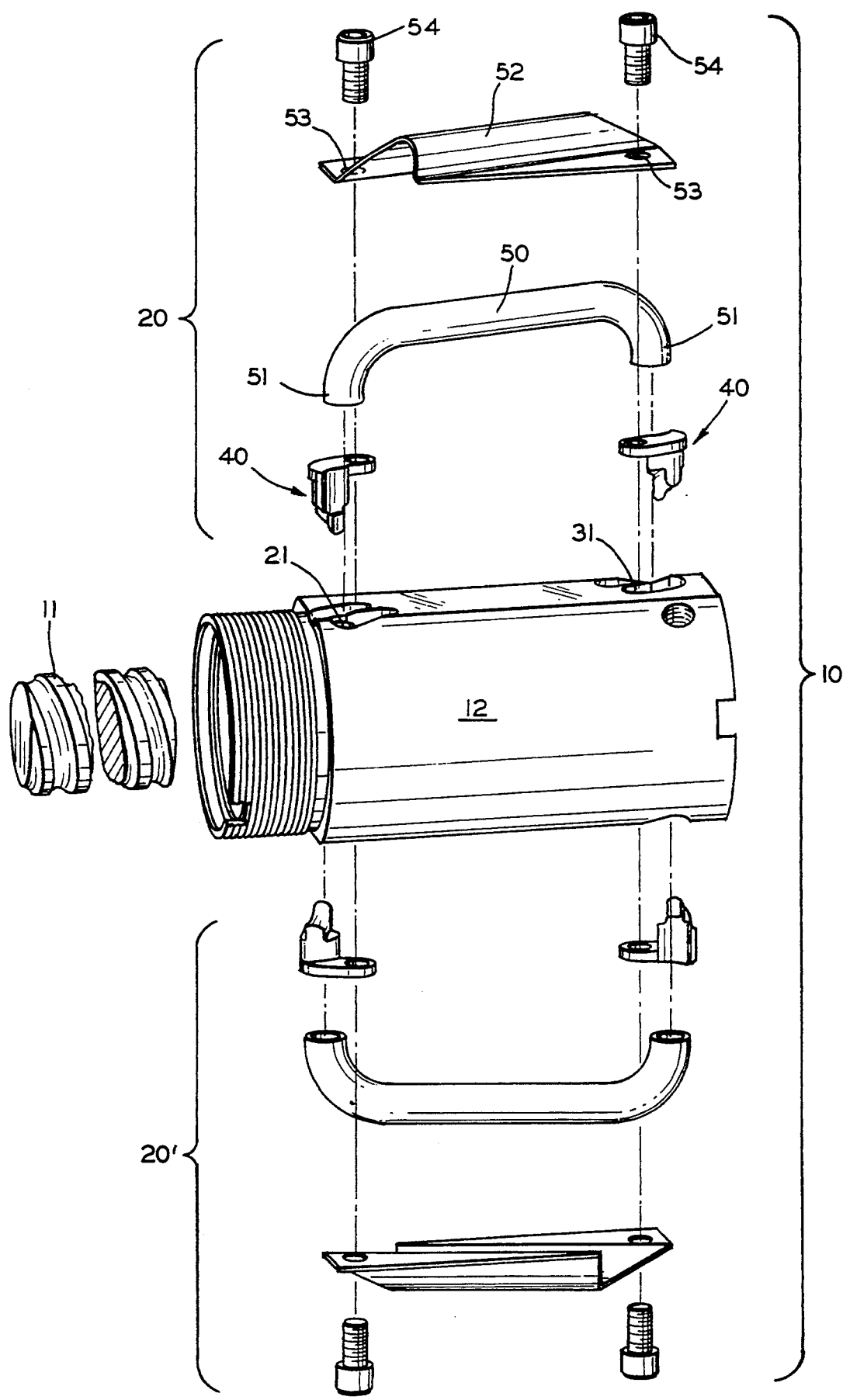
FIG. 1 is an exploded perspective view of a ball nut and screw device in accordance with this invention.
Figure 2:
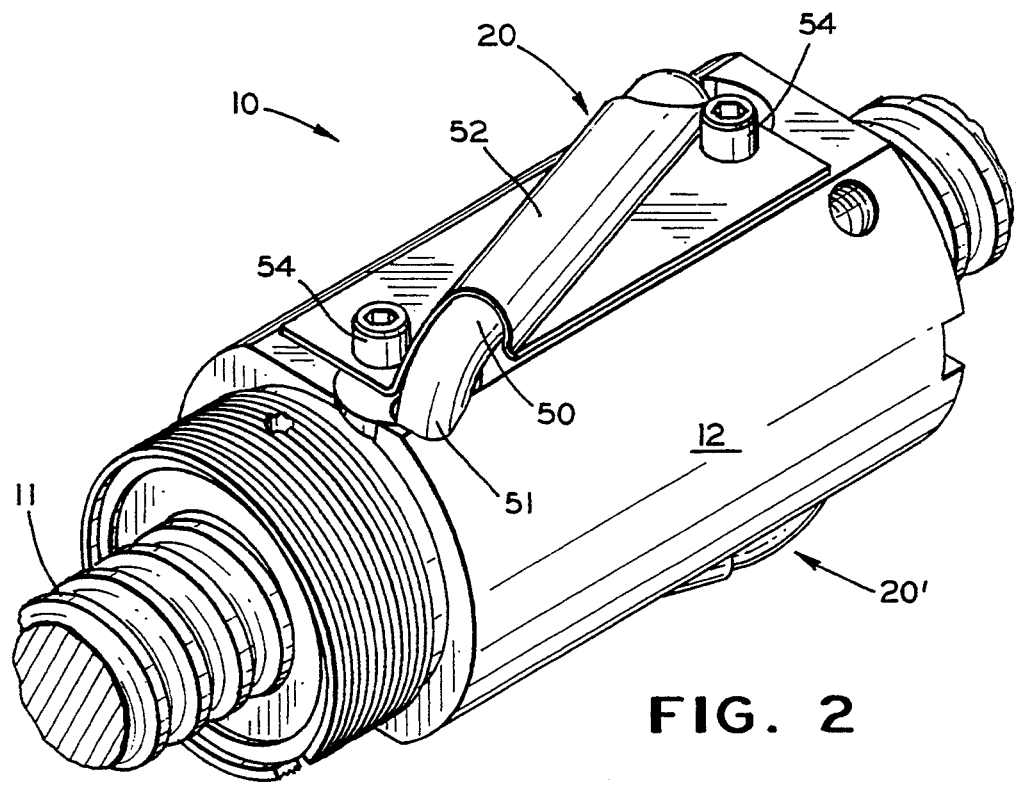
FIG. 2 is a perspective view of the ball nut and screw device illustrated in FIG. 1 shown assembled.

Referring now to the drawings, there is illustrated in FIGS. 1 through 4 a ball nut and screw device, indicated generally at 10, in accordance with this invention. The ball nut and screw device 10 includes an elongated cylindrical screw 11 having an outer surface. First and second helical threads 11a and 11b (see FIG. 3) are formed on the outer surface of the screw 11. The first and second threads 11a and 11b are axially offset from one another so as to be concentric with the longitudinal axis of the screw 11.

The ball nut and screw device 10 further includes a nut 12 having a cylindrical opening formed therethrough. The inner surface of the opening formed through the nut 12 is similarly formed having first and second concentric helical threads 12a and 12b (see FIG. 3) which are axially offset from one another. The helical threads 12a and 12b formed on the nut 12 are complementary in size and shape to the helical threads 11a and 11b formed on the screw 11. Thus, the illustrated embodiment provides two separate, axially offset threads 11a,12a and 11b,12b on the screw 11 and the nut 12. However, it will be appreciated that this invention can be used in a ball nut and screw assembly having only single complementary helical threads formed on the screw and the nut.

Figure 3:
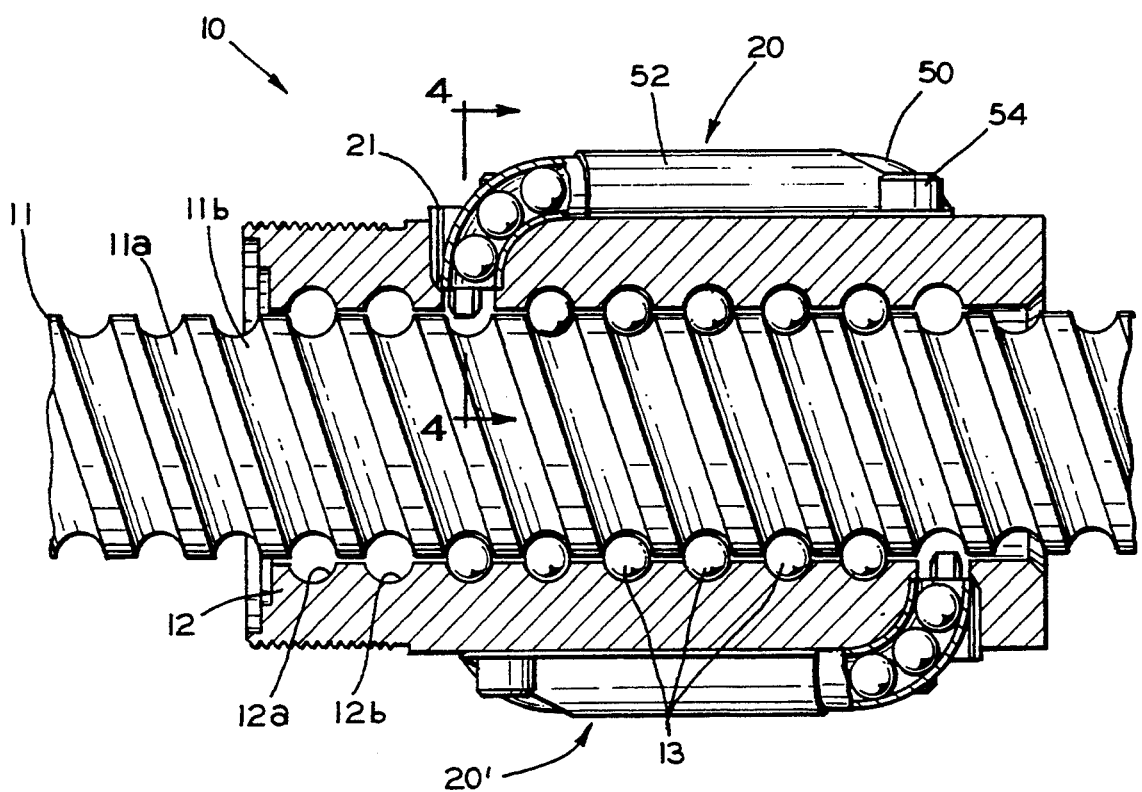
FIG. 3 is a sectional side elevational view of the ball nut and screw device illustrated in FIG. 2.

As best shown in FIG. 3, all of the helical threads 11a,12a and 11b,12b are formed having a generally semi-circular cross section. The outer diameter of the screw 11 is smaller than the inner diameter of the opening 12a formed through the nut 12. Thus, the outer surface of the screw 11 and the inner surface of the nut 12 do not engage one another. Rather, a plurality of balls 13 are disposed between the screw 11 and the nut 12. The balls 13 extend partially into the complementary threads 11a,12a and 11b,12b respectively formed in the screw 11 and the nut 12. Thus, the balls 13 provide a rolling engagement between the screw 11 and the nut 12, similar to a ball bearing.

The screw 11 is typically connected to a source of rotational power (not shown), while the nut 12 is secured to a load to be moved. The load itself is typically non-rotatable, thus preventing rotation of the nut 12. Consequently, when the screw 11 is rotated by the source of rotational power, the nut 12 is moved axially relative thereto. As the screw 11 is rotated, the balls 13 roll throughout the complementary threads 11a,12a and 11b,12b. The structure and operation of the ball nut and screw mechanism 10 thus far described is conventional in the art.

To accommodate the rolling motion of the balls 13 through the complementary threads 11a,12a and 11b,12b, upper and lower ball recirculating mechanisms 20 and 20' are provided. The upper ball recirculating mechanism 20 permits the passage of the balls 13 from one axial end of the first pair of the complementary threads 11a,12a to the other axial end thereof in an endless loop. Similarly, the lower ball recirculating mechanism 20' permits the passage of the balls 13 from one axial end of the second pair of the complementary threads 11b,12b to the other axial end thereof in an endless loop. Inasmuch as the two ball recirculation mechanisms 20 and 20' are otherwise identical, only the structure of the upper ball recirculation mechanism 20 will be explained and illustrated.

Figure 4:
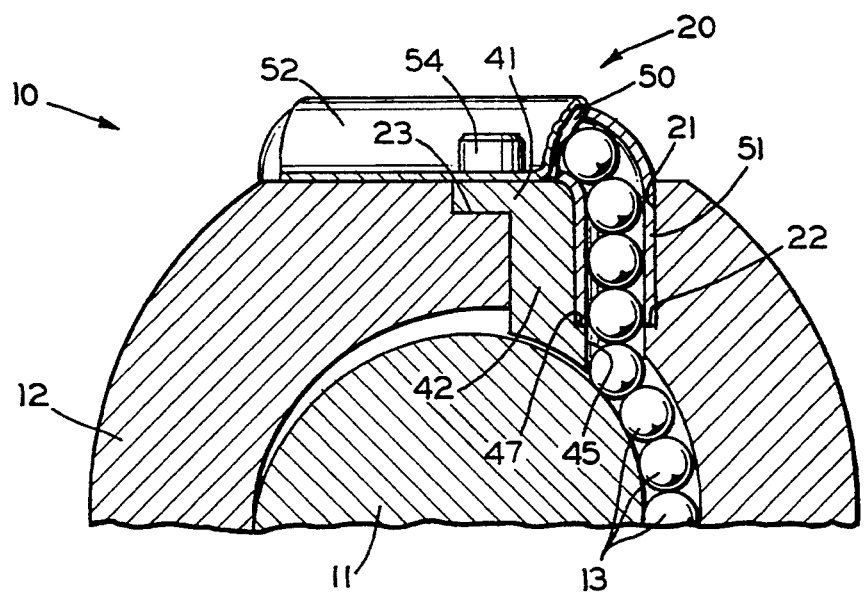
FIG. 4 is a sectional elevational view taken along line 4—4 of FIG. 3.
Figure 5:
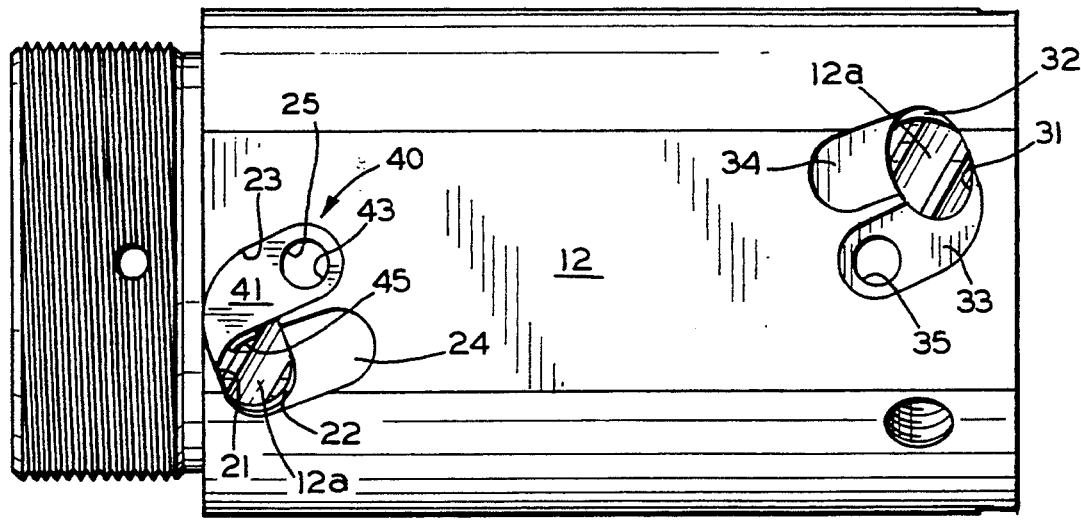
FIG. 5 is a top plan view of the ball nut illustrated in FIGS. 1 through 4 having only one of the two skirt deflectors installed thereon.

As best shown in FIG. 5, the upper ball recirculation mechanism 20 includes a first aperture 21 which is formed through the nut 12 adjacent a first axial end thereof. The first aperture 21 extends inwardly from the outer surface of the nut 12 through to the first helical thread 12a. When looking downwardly therein, the first aperture 21 is generally oval-shaped. Within the first aperture 21, a step 22 (see FIGS. 4 and 5) is formed in the nut 12. The step 22 extends partially about one end of the oval-shaped first aperture 21. On the outer surface of the nut 12, first and second recesses 23 and 24 are formed adjacent to the first aperture 21. Both of the recesses 23 and 24 are generally oval-shaped and extend generally perpendicular to the oval-shaped first aperture 21. The first recess 23 is of uniform depth and has a threaded bore (not shown) formed therein. The second recess 24 is of gradually inclining depth, being the deepest immediately adjacent to the first aperture 21.

Similarly, the upper ball recirculation mechanism 20 also includes a second aperture 31 which is formed through the nut 12 adjacent a second axial end thereof. The second aperture 31 also extends inwardly from the outer surface of the nut 12 through to the first helical thread 11a. As with the first aperture 21, the second aperture 31 is generally oval-shaped when looking downwardly therein. Within the second aperture 31, a step 32 is formed in the nut 12. The step 32 extends partially about one end of the oval-shaped second aperture 31. On the outer surface of the nut 12, first and second recesses 33 and 34 are formed adjacent to the second aperture 31. Both of the recesses 33 and 34 are generally oval-shaped and extend generally perpendicular to the oval-shaped second aperture 31. The first recess 33 is of uniform depth and has a threaded bore 35 formed therein. The second recess 34 is of gradually inclining depth, being the deepest immediately adjacent to the second aperture 31.

Figure 6:
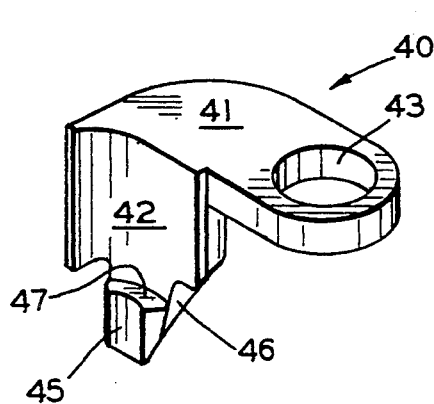
FIG. 6 is an enlarged perspective view of one of the skirt deflectors illustrated in FIGS. 1 through 5.
Figures 7, 8:
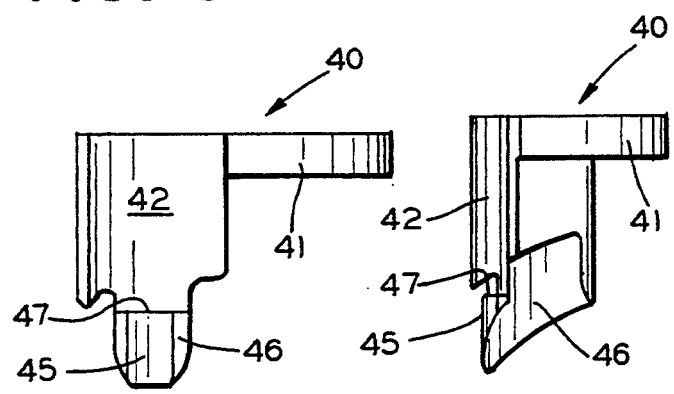
FIG. 7 is a front elevational view of the skirt deflector illustrated in FIG. 6.
FIG. 8 is a right side elevational view of the skirt deflector illustrated in FIG. 7.

The upper ball recirculation mechanism 20 further includes first and second skirt deflectors, indicated generally at 40. One of the skirt deflectors 40 is provided for each of the apertures 21 and 31. The skirt deflectors 40 are identical and are illustrated in detail in FIGS. 6 through 8. As shown therein, each of the skirt deflectors 40 includes an upper flange portion 41 and a depending skirt portion 42. The upper flange portion 41 is generally oval-shaped and is sized to fit within the first, uniform depth recesses 23 and 33 formed in the upper surface of the nut 12. An aperture 43 is formed through the upper flange portion 41 of the skirt deflector 40. When the skirt deflectors 40 are installed on the nut 12 as described above, the apertures 43 are co-axially aligned with threaded bores 25 and 35 formed in the first recesses 23 and 33, respectively. The apertures 43 are provided to facilitate securement of the skirt deflectors 40 to the nut 12 in a manner which will be described below.

The depending skirt portions 42 are generally semi-circular in shape and are sized to fit within the ends of the oval-shaped apertures 21 and 31 opposite to the steps 22 and 32. A pick-up finger 45 extends downwardly from the lower end of each of the skirt portions 42 further into each of the apertures 21 and 31. A supporting web 46 extends between the lower end of each skirt portion 42 and the rearward face of the associated pick-up finger 45. The forward faces of the pick-up fingers 45 are curved and project inwardly a small amount toward the steps 22 and 32 within the apertures 21 and 31 of the nut 12. As a result, arcuate steps 47 are defined between the skirt portions 42 and the pick-up fingers 45. As best shown in FIG. 4, the steps 47 formed on the skirt deflector 40 are positioned opposite the steps 22 and 32 formed within the apertures 21 and 31, respectively, when the skirt deflectors 40 are installed therein.

The upper ball recirculation mechanism 20 further includes a tube 50 which extends across the outer surface of the nut 12 between the first and second apertures 21 and 31. As best shown in FIGS. 1, 3, and 4, the tube 50 is formed having a pair of opposed end portions 51. The end portions 51 curve downwardly and extend into the apertures 21 and 31. The end portions 51 of the tube 50 preferably extend at approximately a ninety degree angle relative to the central portion thereof. The tube 50 defines an inner diameter which is sufficiently large to permit the balls 13 to pass freely therethrough, as will be explained in detail below. A conventional clamp 52 is provided for retaining the tube 50 adjacent to the outer surface of the nut 12. The clamp 52 has a pair of apertures 53 (see FIG. 1) formed therethrough which are positioned so as to be aligned with the apertures 43 formed through the skirt deflectors 40 and with the threaded bores 25 and 35 formed in the nut 12. Thus, the clamp 52 can be secured to the outer surface of the nut 12 by a pair of threaded fasteners 54 (see FIGS. 1 through 3) which retain the skirt deflectors 40 on the nut 12, as described below.

To assemble the upper ball recirculation mechanism 20 to the ball nut and screw device 10, the skirt deflectors 40 are initially inserted within the apertures 21 and 31. When this is done, the upper flange portions 41 are received within the first recesses 23 and 33, and the depending lower skirt portions 42 extend downwardly within the apertures 21 and 31. As discussed above, the upper flange portions 41 are sized to fit within the first recesses 23 and 33. As a result, the skirt deflectors 40 are positively restrained from movement relative to the nut 12 during use. When installed in this manner, the steps 47 of the skirt deflectors 40 are positioned opposite the steps 22 and 32 formed within the respective apertures 21 and 31, also as discussed above.

The depending skirt portions 42 abut and are laterally supported by the inner surfaces of the aperture 21 and 31 when the skirt deflectors 40 are installed. This provides support for such skirt portions and facilitates the positioning of the skirt deflectors during installation. As best shown in FIGS. 3 and 4, the pick-up fingers 45 extend downwardly into the helical threads 11a,12a when the skirt deflectors 40 are installed. The pick-up fingers 45 are provided with face portions which are oriented toward the portions of the threads 11a,12a in which the balls 13 circulate during use.

Next, the tube 50 is installed by inserting the opposed end portions 51 thereof downwardly into the apertures 21 and 31. When this is done, the lowermost end of one of the end portions 51 abuts and is supported on the step 22 formed in the aperture 21 and on the step 47 formed on the skirt deflector 40, as best shown in FIG. 4. Similarly, the lowermost end of the other of the end portions 51 abuts and is supported on the step 32 formed in the aperture 31 and on the step 47 formed on the skirt deflector 40. It can be seen that the thicknesses of the various steps 22, 32, and 45 are all equal to the wall thickness of the end portions 51 of the tube 50. This provides for a flush transition between such steps 22, 32, and 45 and the end portions 51 of the tube 50 as the balls 13 move thereacross, as will be described below. At the same time, the outer surfaces of the end portions 51 are engaged and supported by the inner surfaces of the apertures 21 and 31 and by the inner surfaces of the depending skirt portions 42 to provide lateral support.

Also, the ends of the central portion of the tube 50 adjacent to the end portions 51 are received in the second, gradually inclined recesses 24 and 34 formed adjacent to the apertures 21 and 31, respectively. These gradually inclined recesses 24 and 34 minimize the radially outward distance through which the tube 50 extends and provide additional support therefor. Thus, it is preferable that such recesses 24 and 34 extend co-axially along a line defined between the two apertures 21 and 31.

Next, the clamp 52 is positioned over the tube 50 such that the apertures 53 formed therethrough are aligned with the apertures 43 formed through the skirt deflectors 40 and with the threaded bores 25 and 35 formed in the nut 12. Lastly, the clamp 52 is secured to the outer surface of the nut 12 by the threaded fasteners 54 so as to retain it, the tube 50, and the skirt deflectors 40 on the nut 12. The lower ball recirculation mechanism 20' is assembled in the same manner. However, as mentioned above, the lower ball recirculating mechanism 20' permits the passage of the balls 13 from one axial end of the second pair of the complementary threads 11b,12b to the other axial end thereof in an endless loop. Thus, the apertures formed on the lower outer surface of the nut extend therethrough to such second pair of complementary threads 11b,12b.

In operation, when the shaft 11 is rotated, the balls 13 roll through the first and second pairs of complementary threads 11a,12a and 11b,12b. The direction of such rolling depends upon the direction of rotation of the shaft 11. When they reach one axial end of the complementary threads 11a,12a, the balls 13 contact the inward face of the pick-up finger 45 which, as described above, is positioned therein. As a result, the balls 13 are deflected upwardly out of the complementary threads 11a,12a and into the associated aperture 21. The web 46 provides lateral support for the pick-up finger 45 as the pick-up finger 45 is engaged by the balls 13.

The balls 13 are guided by the skirt deflector 45 upwardly through the first aperture 21 into the associated end portion 51 of the tube 50. As discussed above, the balls move smoothly past the transition between the steps 22 and 45 and into the end portion 51 of the tube 50. Also, the curvature of the face of the pick-up finger 45 is substantially the same as that of the inner surface of the end portion 51 of the tube 50. This further facilitates a smooth transition for the balls 13 over the mating edges of the face of the pick-up finger 45 to the interior of end portion 51 of the tube 50. The balls 13 then travel through the tube 50, down the other end portion 51 thereof, and into the second aperture 31. The skirt deflector 45 associated with the second aperture 31 is identical to the skirt deflector 45 associated with the first aperture 21. Thus, the balls 13 are similarly guided smoothly over the transition between the end portion 51 of the tube 50 and the steps 32 and 45 and into the complementary threads 11a,12a.

As discussed above, the screw 11 and the nut 12 have been described and illustrated as having a double helical thread 12b formed in the inner surface thereof. However, it is well known that the screw 11 and the nut 12 may be formed having only one or having three or more separate helical threads which extend adjacent to one another throughout the length thereof. For each thread thus formed, one or more ball recirculating mechanisms as described above can be provided. It is also known to divide a single helical thread into a plurality of zones. In this case, a ball recirculation mechanism can be provided for each of the individual zones.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A ball nut and screw assembly comprising:
   a screw including an outer surface having a thread formed thereon;
   a nut including an opening formed therethrough defining an inner surface having a thread formed thereon, said nut further including first and second apertures formed therethrough extending from said nut thread to an outer surface of said nut;
   a plurality of balls disposed in both of said screw thread and said nut thread; and
   means for recirculating said balls between said first and second apertures, said means for recirculating including a skirt deflector disposed within each of said apertures, at least one of said skirt deflectors including a flange portion, a skirt portion extending from said flange portion, and a pick-up finger extending from said skirt portion, a step being defined between said skirt portion and said pick-up finger, said pick-up finger extending into said nut thread to deflect said balls into and out of said apertures.

2. The ball nut and screw assembly defined in claim 1 wherein said one of said skirt deflectors further includes a supporting web extending between said skirt portion and said pick-up finger.

3. The ball nut and screw assembly defined in claim 1 wherein said step is arcuate in shape.

4. The ball nut and screw assembly defined in claim 1 wherein said means for recirculating includes a tube having an end portion abutting said step.

5. The ball nut and screw assembly defined in claim 1 wherein a step is formed in said nut within at least one of said first and second apertures.

6. The ball nut and screw assembly defined in claim 5 wherein said step formed in said nut is co-planar with said step defined on said skirt deflector.

7. The ball nut and screw assembly defined in claim 5 wherein said means for recirculating includes a tube having an end portion abutting said step formed in said nut and said step defined on said skirt deflector.

8. The ball nut and screw assembly defined in claim 1 wherein each of said skirt deflectors includes a flange portion, a skirt portion extending from said flange portion, and a pick-up finger extending from said skirt portion, a step being defined on each of said skirt deflectors between said skirt portions and said pick-up fingers.

9. A ball nut and screw assembly comprising:
   a screw including an outer surface having a thread formed thereon;
   a nut including an opening formed therethrough defining an inner surface having a thread formed thereon, said nut further including first and second apertures formed therethrough extending from said nut thread to an outer surface of said nut, a step being defined in said nut within at least one of said first and second apertures;
   a plurality of balls disposed in both of said screw thread and said nut thread; and
   means for recirculating said balls between said first and second apertures, said means for recirculating including a skirt deflector disposed within each of said apertures and extending into said nut thread to deflect said balls into and out of said apertures.

10. The ball nut and screw assembly defined in claim 9 wherein said step is arcuate in shape.

11. The ball nut and screw assembly defined in claim 9 wherein said means for recirculating includes a tube having an end portion abutting said step.

12. The ball nut and screw assembly defined in claim 9 wherein at least one of said skirt deflectors includes a flange portion, a skirt portion extending from said flange portion, and a pick-up finger extending from said skirt portion, a step being defined between said skirt portion and said pick-up finger, said pick-up finger extending into said nut thread to deflect said balls into and out of said apertures.

13. The ball nut and screw assembly defined in claim 12 wherein said step formed in said nut is co-planar with said step defined on said skirt deflector.

14. The ball nut and screw assembly defined in claim 12 wherein said means for recirculating includes a tube having an end portion abutting said step formed in said nut and said step defined on said skirt deflector.

15. The ball nut and screw assembly defined in claim 9 wherein a step is defined in said nut within each of said first and second apertures.

16. A ball nut and screw assembly comprising:
   a screw including an outer surface having a thread formed thereon;
   a nut including an opening formed therethrough defining an inner surface having a thread formed thereon, said nut further including first and second apertures formed therethrough extending from said nut thread to an outer surface of said nut, at least one of said first and second apertures having a non-circular shape;
   a plurality of balls disposed in both of said screw thread and said nut thread; and
   means for recirculating said balls between said first and second apertures, said means for recirculating including a skirt deflector disposed within each of said apertures and extending into said nut thread to deflect said balls into and out of said apertures.

17. The ball nut and screw assembly defined in claim 16 wherein said one of said first and second apertures is generally oval-shaped.

18. The ball nut and screw assembly defined in claim 16 wherein each of said first and second apertures has a non-circular shape.

19. The ball nut and screw assembly defined in claim 18 wherein each of said first and second apertures is generally oval-shaped.

20. A ball nut and screw assembly comprising:
   a screw including an outer surface having a thread formed thereon;
   a nut including an opening formed therethrough defining an inner surface having a thread formed thereon, said nut further including first and second apertures formed therethrough extending from said nut thread to an outer surface of said nut, said outer surface of said nut having a recess formed therein adjacent to at least one of said first and second apertures;

a plurality of balls disposed in both of said screw thread and said nut thread; and means for recirculating said balls between said first and second apertures, said means for recirculating including a skirt deflector disposed within each of said apertures and extending into said nut thread to deflect said balls into and out of said apertures, said means for recirculating further including a tube extending between said skirt deflectors, a portion of said means for recirculating being disposed within said recess.

21. The ball nut and screw assembly defined in claim 20 wherein a portion of at least one of said skirt deflectors is disposed within said recess.

22. The ball nut and screw assembly defined in claim 21 wherein said one of said skirt deflectors includes a flange portion and a skirt portion extending from said flange portion, said flange portion being disposed within said recess.

23. The ball nut and screw assembly defined in claim 20 wherein a recess is formed in said outer surface of said nut adjacent to each of said first and second apertures.

24. The ball nut and screw assembly defined in claim 23 wherein portions of each of said skirt deflectors are respectively disposed within each of said recesses.

25. The ball nut and screw assembly defined in claim 24 wherein each of said skirt deflectors includes a flange portion and a skirt portion extending from said flange portion, said flange portions being respectively disposed within each of said recesses.

26. The ball nut and screw assembly defined in claim 20 wherein a portion of said tube is disposed within said recess.

27. The ball nut and screw assembly defined in claim 26 wherein a recess is formed in said outer surface of said nut adjacent to each of said first and second apertures.

28. The ball nut and screw assembly defined in claim 27 wherein portions of said tube are respectively disposed within each of said recesses.

29. The ball nut and screw assembly defined in claim 20 wherein said outer surface of said nut has first and second recesses formed therein adjacent to at least one of said first and second apertures, a portion of at least one of said skirt deflectors being disposed within said first recess and a portion of said tube being disposed within said second recess.

30. The ball nut and screw assembly defined in claim 29 wherein said outer surface of said nut has first and second recesses formed therein adjacent to each of said first and second apertures, a portion of each of said skirt deflectors being respectively disposed within said first recesses and portions of said tube being respectively disposed within said second recesses.

* * * * *